United States Patent [19]

Bade

[11] 4,083,679

[45] Apr. 11, 1978

[54] INSTALLATION FOR THE BURNING OF SINTERING AND COOLING OF CEMENT CLINKER, LIME, MAGNESITE, DOLOMITE, AND THE LIKE

[75] Inventor: Erich Bade, Beckum, Germany

[73] Assignee: Readymix Cement Engineering GmbH & Co. KG, Ratingen, Germany

[21] Appl. No.: 760,018

[22] Filed: Jan. 17, 1977

[30] Foreign Application Priority Data

Jul. 9, 1976 Germany .............................. 2630895

[51] Int. Cl.² .............................. F27B 1/04; C04B 7/02

[52] U.S. Cl. .............................. 432/99; 34/164; 34/169; 432/58; 432/106; 106/100

[58] Field of Search .................. 432/14, 15, 58, 97–99, 432/106; 106/100; 34/164, 169, 65

[56] References Cited

U.S. PATENT DOCUMENTS

| | | | |
|---|---|---|---|
| 2,580,235 | 12/1951 | Lellep | 432/106 |
| 3,433,468 | 3/1969 | Schoenlaub | 34/164 |
| 3,692,285 | 9/1972 | Avery | 432/99 |
| 3,741,715 | 6/1973 | Sylvest | 432/58 |
| 3,986,819 | 10/1976 | Heian | 432/106 |

*Primary Examiner*—John J. Camby
*Assistant Examiner*—Henry C. Yuen
*Attorney, Agent, or Firm*—Joseph A. Geiger

[57] ABSTRACT

An installation for the burning and/or sintering and cooling of cement clinker, lime, magnesite, dolomite and similar materials in granular or crushed form, especially adapted as a small-scale cement mill or lime mill, having two movable materials carrying platforms arranged inside a burn chamber, in a staggered relationship, and an intermediate wall subdividing the burn chamber into a forehearth for the upper platform and a main hearth for the lower platform. Blowers supply combustion air, draw the used burn gases through air permeable back walls above the platform, recirculate them into the changing shaft to dry and preheat the materials, and cool the sintered materials in the cooling shaft. An aftersinter platform or rotating aftersinter kiln may be arranged between the lower platform and the cooling shaft.

16 Claims, 4 Drawing Figures

INSTALLATION FOR THE BURNING OF SINTERING AND COOLING OF CEMENT CLINKER, LIME, MAGNESITE, DOLOMITE, AND THE LIKE

BACKGROUND OF THE INVENTION

1. Field of the Invention

The present invention relates to devices and installations for the burning and/or sintering and subsequent cooling of cement clinker, lime, magnesite, dolomite, and similar materials, such as iron ore pellets or lightweight filler materials (expanded clay) and, more particularly, to a small-scale cement mill or lime mill.

2. Description of the Prior Art

Among known installations of the above-described type are the so-called multi-level shaft kilns which have a charging shaft into which the raw granulate or crushed rock is fed from above, and inside which the latter is dried and preheated. At its lower end, the shaft opens into a burn chamber inside which is arranged a movable platform supporting the charge. The latter forms a slope whose exterior layer is periodically discharged over the forward edge of the platform, as the platform is retracted, the treated materials falling into a cooling shaft. These installations are equipped with various blowers for the introduction and removal of hot gases and cold air. Shaft kilns of this type are disclosed in German Offenlegungsschrift No. 2,312,379 and No. 2,434,852.

In comparison with rotary kilns, the multi-level shaft kilns have the advantage that both their construction costs and their operating costs are lower.

In such a multi-level shaft kiln, the burning or sintering process takes place inside a burn chamber in which the slope of the dried and preheated raw granulate is exposed to the hot combustion gases produced by a burner unit. The result is something of a combined burning and sintering process. While the granulate is being calcined in the upper portion of the material slope, it is being sintered in the lower portion of the slope, for example. However, the exact place where calcining stops and sintering starts cannot be determined and controlled, as the two processes depend from a multitude of parameters.

Attempts to better control the changing conditions which determine the burning process and the sintering process have already led to the development of shaft kilns of the so-called double-slope type and of hearth kilns which have staggered superposed multiple hearths, using several burn chambers. Such a kiln is shown in German Auslegeschrift No. 1,558,076. These special kilns, however, do not produce a controlled material flow. While they offer an improved controllability of the burning process and sintering process, they have the additional shortcoming that their construction is considerably more complex and costly, limiting their applicability to very large installations of elevated construction cost.

SUMMARY OF THE INVENTION

Underlying the present invention is the primary objective of suggesting an improved multi-level shaft kiln of the type described further above, which uses only one burn chamber in conjunction with a movable platform supporting the materials in such an arrangement that the preburn process and burn process, or the calcining and sintering process, respectively, are both performed in the one burn chamber, but are controllable independently of each other. A further objective of the invention is to provide these improvements with a minimal increase in construction costs, so that they are also applicable to installations of smaller size and capacity.

The present invention proposes to attain these objectives by suggesting a multi-level shaft kiln which includes at least two superposed, horizontally offset movable platforms and at least one intermediate wall arranged above the lower platform at a predetermined distance from the discharge end of the upper platform, so as to separate the burn chamber into a forehearth and a main hearth.

This novel shaft kiln arrangement makes it possible, in spite of the use of only one burn chamber, to separately control the preliminary treatment process and the main treatment process. It makes it possible, for example, to adjust the calcining process in the forehearth independently of the sintering process in the main hearth. This arrangement, while offering the desired improved controllability of the burn and sintering processes, has the advantage of a very simple structure, making it particularly suitable for installations of smaller size, where the construction costs have to be kept low.

These features render the use of the present invention particularly advantageous in connection with small-scale cement mills, so-called "cement mini-kilns". While construction costs are kept low, the invention nevertheless offers those operating cost advantages which have heretofore only been available with very costly large-scale installations. The burning plant of such a small-scale cement mill, in order to be competitive, must meet various conditions, including, in particular, low operating costs and low manufacturing costs, ecological acceptability, and simple operational requirements, for supervision by a minimally skilled technician. It must further be possible to perform startup and shutdown operations on short notice, while operational reliability is maintained and maintenance and repair costs are held to a minimum.

The present invention makes it possible to meet these requirements in an optimal way, giving decisive advantages to any small-scale cement mill which incorporates its novel features. While the construction costs of such an installation are thus kept low, its small size makes it possible to choose a location which is closer to the market, thereby reducing transportation time and greatly lowering transportation costs. While the raw material carrying incoming traffic and the product carrying outgoing traffic is thus kept much lower than would be the case with a large-scale mill, there is a good chance that this traffic can be accommodated on an existing road network, so that the construction of special connecting roads can be dispensed with.

The greatly simplified arrangement of the burn chamber brings with it a corresponding simplification of the controls of the burning plant, so that complex automatic controls of the type which are used in large-scale cement mills are not needed and corresponding economies in investment costs and operating costs are realized.

Lastly, such a small-scale cement mill has correspondingly lower emissions of dust and noise than conventional cement mills, with the result that the construction of a small-scale cement mill may be acceptable at a location where the construction of a large-scale cement mill would create a prohibitive impact on the physiological environment. With these advantages, a small-scale cement mill incorporating the present invention may also be ideally suited for use in distant regions and in developing countries. In the event that capacity expansion becomes necessary at a later date, this can be accomplished very easily by adding one or more similar small-scale cement mills.

By way of a further refinement of the present invention, it is suggested that horizontal gas passages be provided in the intermediate wall, so that a portion of the burn gases is allowed to pass through the intermediate wall, thereby moving directly from the burner unit in the main hearth to the forehearth.

It may further be advantageous to protect the lower exposed edge of the intermediate wall against the direct impingement of the hot burn gases by arranging a transverse baffle at a short distance ahead of that edge. Such a baffle serves to reduce the heat load on the intermediate wall and to divide the gas flow. Additional guide baffles may be arranged ahead of the transverse baffle, depending upon the desired gas flow.

The present invention further suggests the arrangement of a generally vertical back wall above each movable platform, so as to retain the materials under treatment in the rearward sense. These back walls are preferable permeable to the burn gases, having a suitable channel system and a manifold connection leading to the intake side of a blower. The latter thus removes at least a portion of the burn gases from each hearth through the back wall. The back walls may be subdivided into several wall sections, each having an independently adjustable gas flow.

It is further suggested that the blower which draws gas from the back wall of the main hearth have its pressure side connected to the forehearth, thereby drawing gases from the main hearth and pumping them into the forehearth. To these gases may be added fresh air through an air intake connection on the intake side of the blower.

Another blower is preferably connected to the back wall of the forehearth platform, so as to similarly draw gases through the latter, pumping them into the lower portion of the charging shaft of the installation, where they serve to dry and preheat the arriving raw granulate or crushed rock. After drying and preheating the arriving raw materials, these gases are drawn off by still another blower, connected near the intake end of the charging shaft, at which point the gases are scrubbed and exhausted to the atmosphere, or reused for a different work process.

In a preferred embodiment of the invention, the main hearth has a cooling shaft directly connected to its bottom, into which the sintered materials are discharged from the lower platform, via a short chute. Cooling air which is being blown into the cooling shaft, in counterflow to the treated materials, passes into the burn chamber, where it serves as secondary combustion air. This arrangement eliminates the need for a special secondary combustion air blower and associated air conduits.

In certain cases, it may be desirable to subject the sintered materials to an aftersintering treatment. The invention provides for this possibility by suggesting a suitable aftersinter platform between the advanced position of the forward edge of the movable lower platform and the chute which leads to the cooling shaft. Alternatively, an aftersinter zone can be arranged in the upper portion of the cooling shaft itself, by arranging a vertical partition inside the latter, the aftersinter zone being formed by that portion of the cooling shaft which adjoins the chute. Special materials, such as lime, for example, may require an extended aftersintering treatment which can be accomplished by arranging a rotating aftersintering kiln between the main hearth and the cooling shaft. Such a kiln receives the materials directly from the lower movable platform, via the aforementioned chute, and it discharges the aftersintered materials directly into the cooling shaft.

As a safety feature, the present invention further suggests the arrangement of an auxiliary chimney above the burn chamber which serves as a protection against explosions.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows.

DESCRIPTION OF THE PREFERRED EMBODIMENTS

Figure 1:
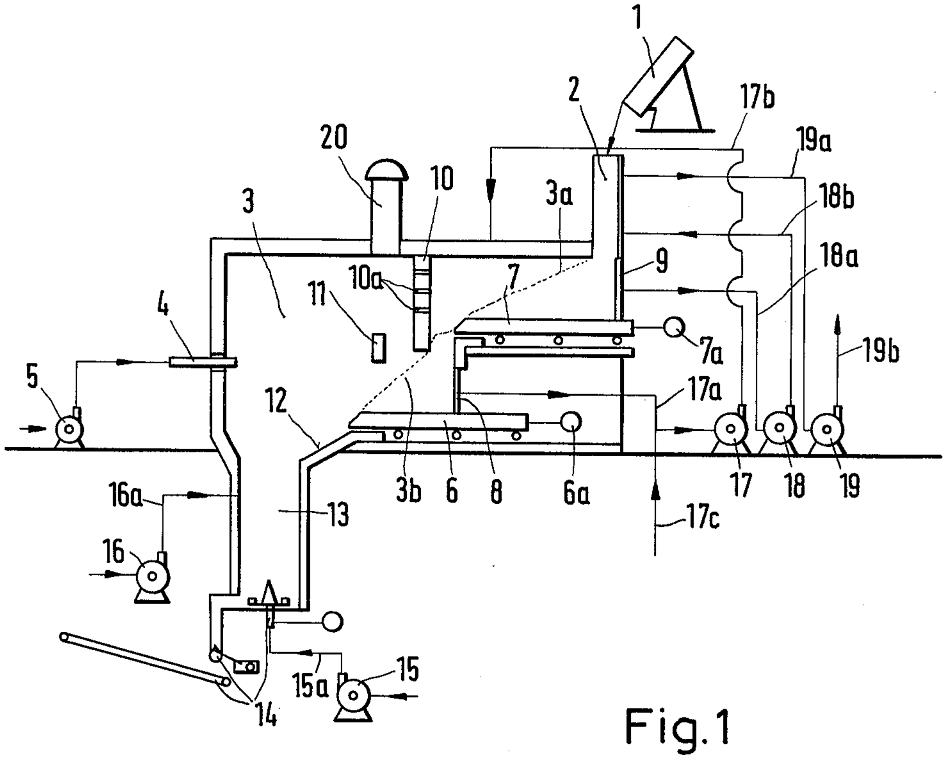
FIG. 1 shows, in a schematic representation, a longitudinal cross section of a burning and sintering installation, with charging shaft, burn chamber, and cooling shaft, embodying the present invention.

Referring to FIGS. 1–4, it can be seen that the four embodiments illustrated in these figures have all the same basic burn plant. They differ from each other insofar as they have different arrangements for the aftersintering treatment, three different approaches being illustrated in FIGS. 2, 3, and 4, while the embodiment of FIG. 1 includes no provision for aftersintering treatment.

In each of the four embodiments, raw granulate is fed into the charging shaft 2 from above by a granulation plate 1. At its bottom, the charging shaft 2 opens into a burn chamber 3 which is being heated by one or several burner units 4, primary combustion air being supplied to the burner or burners 4 through a common burner blower 5, or through several separate burner blowers. In a case where the raw material is supplied in granulated form to the treatment plant, as in the case of crushed rock, the granulation plate 1 may be omitted.

Inside the burn chamber 3, towards the rear of the latter and underneath the charging shaft 2, are arranged two substantially horizontally oriented movable platforms 6 and 7. The two platforms are arranged in a staggered relationship, the lower platform 6 being offset forwardly in relation to the upper platform 7. To the two platforms 6 and 7 are connected suitable platform drives **6*a* and 7*a***, respectively.

Above each movable platform is arranged a generally vertically extending, gas-permeable back wall, the lower back wall 8 forming a material retaining wall between the lower platform 6 and the forward extremity of the upper platform 7, the upper back wall 9 forming a similar retaining wall between the rear portion of the upper platform 7 and the rear wall of the charging shaft 2. The two stationary back walls 8 and 9 thus retain the raw materials under treatment from the rear, forming a closure against the movable platforms in their advanced and retracted positions.

The particular staggered arrangement of the two movable platforms 6 and 7, and the additional arrangement of a generally vertically extending intermediate wall 10 ahead of the upper platform 7, at a distance from the latter, operates to divide the burn chamber 3 into a forehearth 3*a* in the area of the upper platform 7, and a main hearth 3*b* in the area of the lower platform 6. The forehearth 3*a* can thus be used to perform a preburning or calcining treatment, while a burning or sintering treatment takes place in the main hearth 3*b*.

The intermediate wall 10, which extends downwardly from the ceiling of the burn chamber 3 into contact with the upper end portion of the materials slope on the lower platform 6, has arranged in it a number of transverse gas passages 10*a* through which the burn gases can pass directly from the upper portion of the burn chamber 3 into the forehearth 3*a*. The gas passages 10*a* may have the form of transverse slots. The exposed lower edge of the intermediate wall 10 is preferably protected against the direct impingement of the hot burn gases by a transversely extending baffle 11, arranged at a distance in front of the lower edge of the intermediate wall 10. The baffle 11, or a plurality of transverse baffle members, in addition to protecting the lower edge of the intermediate wall 10, may also serve as gas flow guides by means of which the flow of burn gases can be divided and controlled in a manner most suitable for the particular treatment process performed. In the drawings, however, only one transverse baffle member is shown at 11, for reasons of simplicity of the drawing.

In the bottom area of the burn chamber 3, below and in front of the movable platform 6, is further arranged a chute 12, which may be stationary or movable. The treated materials which are discharged from the forward edge of the lower platform 6 pass over the chute 12 into a generally vertical cooling shaft 13 extending downwardly from the forward bottom portion of the burn chamber 3. At the lower end of the cooling shaft 13 is arranged a suitable discharge unit 14. Also arranged in the bottom end portion of the cooling shaft 13 is an inlet for a pressure line 15*a* through which cooling air is supplied by a cooling air blower 15. To the upper portion of the cooling shaft 13 is connected at least one additional pressure line 16*a*, supplying air from a second cooling air blower 16, the burnt or sintered materials being temporarily maintained in a floating condition by the entering air stream, thereby producing a particularly intensive cooling action.

To the lower back wall 8, above the lower platform 6, is connected a suction line 17*a* which leads to the intake side of a first circulation blower 17 whose pressure side is connected to the forehearth 3*a*, via a pressure line 17*b*. To the suction line 17*a* of the blower 17 is further connected a fresh air intake 17*c*, through which air can be admixed to the hot gases which are drawn through the back wall 8.

The upper back wall 9 is similarly connected to a suction line 18*a* of a second circulation blower 18, whose pressure line 18*b* leads to the lower portion of the charging shaft 2. The gas which is thus drawn from the forehearth 3*a*, through the back wall 9, enters the shaft 2 in counterflow to the incoming raw materials, serves to dry and preheat the raw granulate or crushed rock which is to be treated in the burn plant.

The gas which is pumped into the charging shaft 2 by the circulation blower 18 may exhaust through the open upper end of the shaft 2, but, preferably, there is provided still another circulation blower 19 whose suction line 19*a* is connected to the upper end portion of the charging shaft 2, thereby drawing from the latter the warm gas which is humid from drying the raw materials. The pressure line 19*b* of the blower 19 may lead to the atmosphere, preferably via a suitable scrubber which removes toxic gas components, or the gas may be used for still another operating process in which its remaining heat is being put to good use. One such possibility is to reintroduce the gas into the lower portion of the charging shaft 2, in order to obtain a more gentle drying action.

An auxiliary chimney 20 in the ceiling of the burn chamber 3 serves as a protection against explosions. Depending upon the heat load on the walls of the burn chamber 3, the latter are of either steel, or steel-reinforced concrete, or brick.

In the following will be described, by way of an example, the sintering process, as it applies to cement clinker, for instance, using as a treatment installation the embodiment of FIG. 1:

The granulation plate 1 feeds granulated raw materials to the charging shaft 2, where they are dried and preheated by hot gas which flows upwardly and across the slowly descending raw materials. In this process, the temperature of the raw materials is raised from 20° C to approximately 300° C, the treatment gas which is blown into the shaft 2 through the pressure line 18*b* having an initial temperature of approximately 380° C.

The preheated dried granulate advances into the forehearth 3*a*, onto a material pile carried by the upper movable platform 7. The materials resting on the platform 7 form a natural slope towards the forward edge of the platform 7. This material pile is now heated to a temperature between approximately 1050° C and 1100° C, so that a calcination of the granulate takes place. The burn gases emanating from the burner unit 4 and flowing around the bottom edge of the intermediate wall 10 into the forehearth 3*a*, have a temperature of approximately 1900° C, but this temperature is lowered to approximately 1300° C, as cooler gases of approximately 400° C, entering the forehearth 3*a* through the pressure line 17*b*, are admixed to the hot burn gases. But, because the temperature of the gases which are drawn through the back wall 8 of the lower platform 6 is considerably above 400° C, fresh air of approximately 20° C needs to be admixed to these gases in the suction line 17*a*, ahead of the blower 17.

The calcined cement raw materials on the sloping portion of the material pile carried by the upper platform 7 are periodically discharged onto the lower platform 6, through a reciprocating movement of the upper platform 7 which is created by the platform drive 7*a*. A similarly sloping pile of materials, carried by the lower platform 6, is heated to a temperature of approximately 1450° C, as the flow of hot burn gases, whose temperature is approximately 1900° C, impinges on the material pile of the platform 6 inside the main hearth 3*b*. The result is a sintering action on the materials carried by the lower platform 6. In order to advance the sintered materials, and in order to prevent these materials from baking together, the lower platform 6 executes a continuous reciprocating motion, like the upper platform 7, so that the outermost layer of the sloping portion of the material pile on the platform 6 is periodically discharged from the latter. The drive 6a produces the reciprocating motion of the platform 6.

The sintered material, or so-called clinker, which is being discharged from the lower platform 6, slides over the inclined chute 12 into the cooling shaft 13, where it is first exposed to a cooling air stream which enters the upper portion of the cooling shaft through the pressure line 16a. This cooling air stream not only removes a large amount of heat from the clinker, it also loosens it by temporarily floating the descending clinker. As the sintered materials move downwardly inside the cooling shaft 13, they are further cooled by an air stream which is being injected into the lower end portion of the cooling shaft 13 by means of the cooling air blower 15. The resultant material temperature at the discharge end of the cooling shaft thus depends on the relationship between the size of the cooling shaft 13 and the rate at which cooling air is injected into it by the blowers 15 and 16. The cooling air, heated as a result of its cooling action inside the cooling shaft 13, exits from the upper end of the latter into the burn chamber 3, where it serves as secondary combustion air for the burner unit 4.

Accordingly, while primary combustion air is supplied by the burner blower 5, entering the system at the burner unit 4, secondary combustion air is supplied by the cooling air blowers 15 and 16. The used gases leave the system through the suction line 19a of the circulation blower 19. These gases are humidity-laden and have a temperature of approximately 110° C. Depending upon the actual layout of the overall installation and the type of auxiliary processes which are being operated, these humid exhaust gases may be used in some ulterior heating application.

Figure 2:
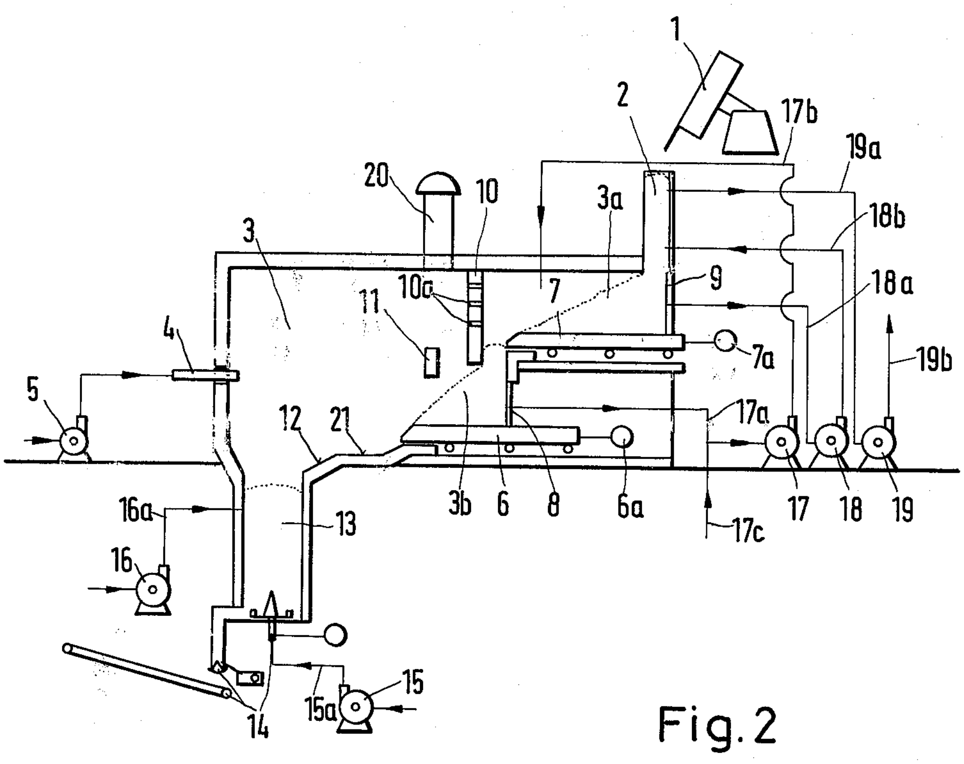
FIG. 2 shows, in a representation similar to that of FIG. 1, a second embodiment of the invention, where an aftersinter platform is arranged in the burn chamber.

The embodiment which is illustrated in FIG. 2 is very similar to the embodiment of FIG. 1 which has been described in the foregoing. Its operation is also generally identical to the earlier-described operation of the first embodiment. The only difference between the two embodiments is that the embodiment of FIG. 2 further includes an aftersinter platform 21 between its chute 12 and its lower platform 6. The aftersinter platform 21 is substantially horizontal, extending from the advanced position of the forward edge of the lower platform 6 to the upper edge of the chute 12. The sintered materials which are being discharged from the material slope on the lower platform 6 onto the aftersintering platform 21 are thus subjected to an aftersintering treatment, before they are being discharged into the cooling shaft 13. Such an aftersintering treatment may be necessary in the case of raw materials which present certain sintering problems.

Figure 3:
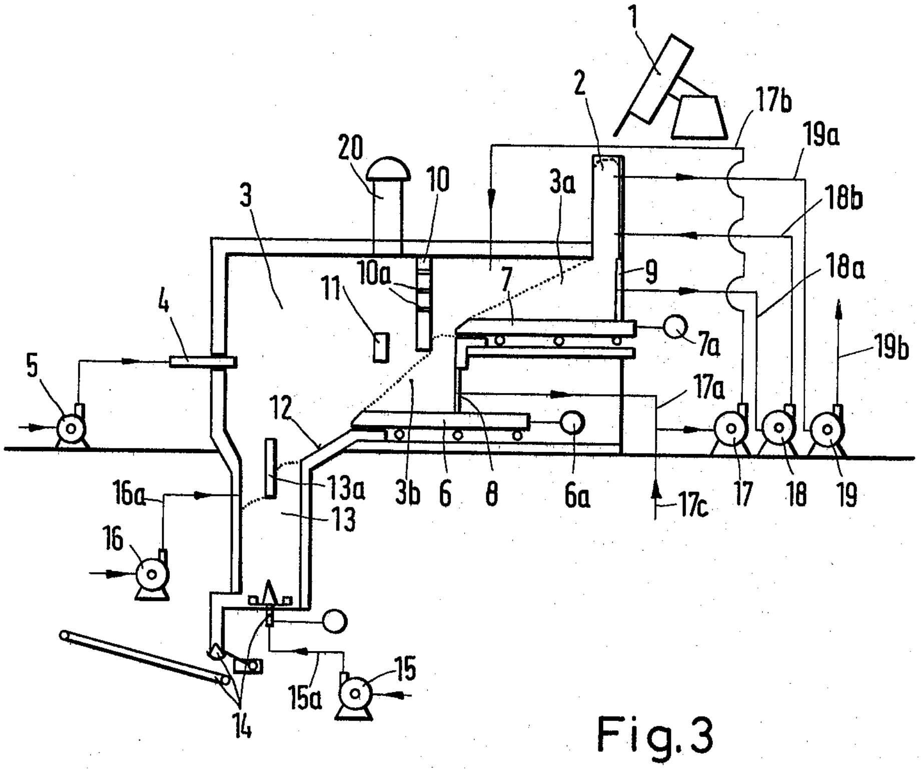
FIG. 3 shows, in another similar representation, a third embodiment of the invention, in which an aftersinter zone is arranged inside the cooling shaft.

The embodiment of FIG. 3 shows a variation of the embodiment of FIG. 2, where arrangements have been made for an aftersintering treatment in the upper portion of the cooling shaft 13. For this purpose, there is provided inside the cooling shaft 13 a generally vertically extending partition wall 13a which, by shielding a portion of the materials against the cooling air flow from the pressure line 16a, provides an aftersintering zone between the partition wall 13a and the chute 12. This embodiment has the advantage of having a burn chamber layout which is generally identical to that of FIG. 1, while the previously described embodiment of FIG. 2 requires a somewhat longer burn chamber 3, in order to accommodate the horizontal aftersinter platform 21.

Figure 4:
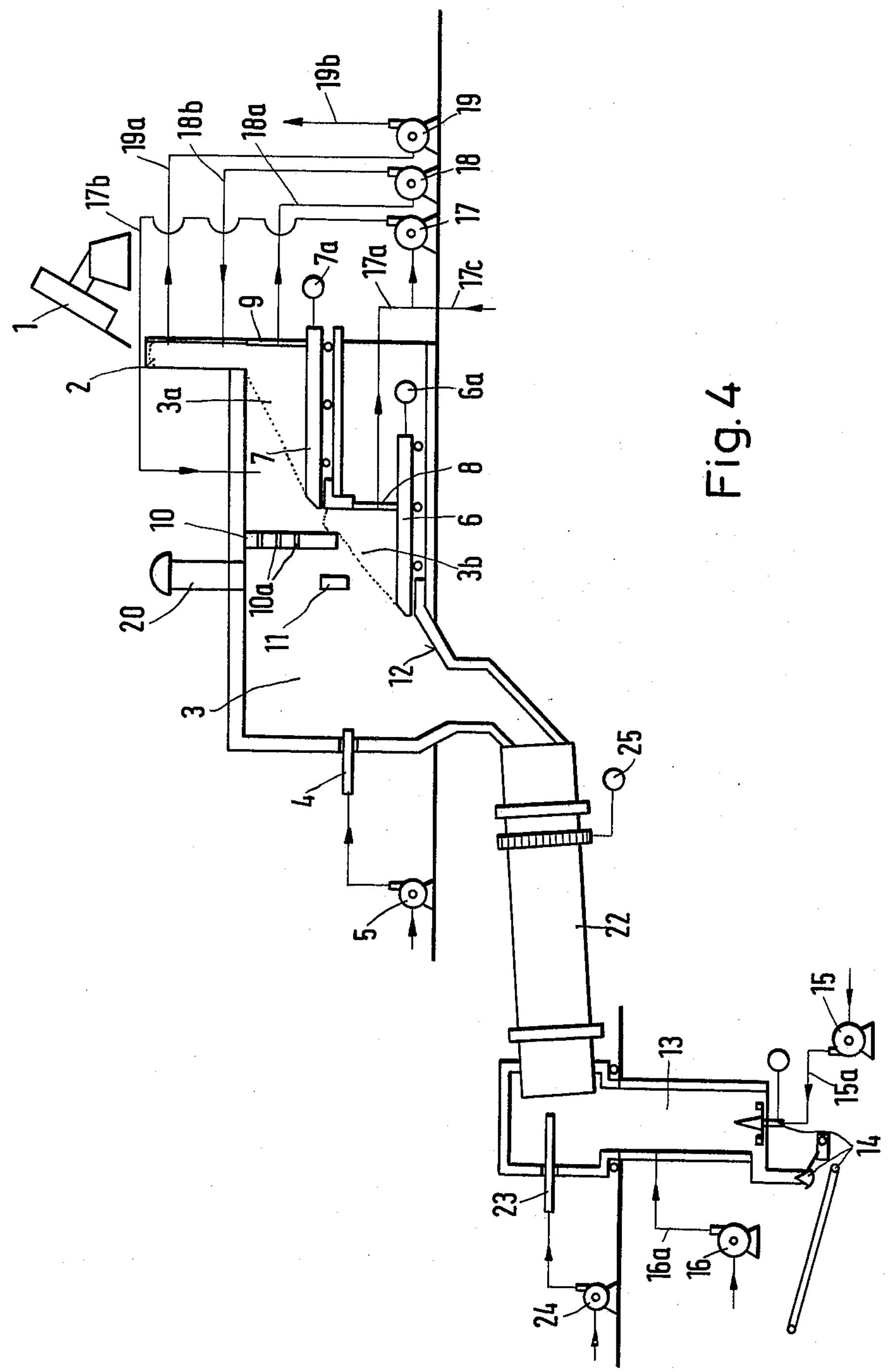
FIG. 4 shows, in another representation similar to that of FIG. 1, a fourth embodiment of the invention, in which a rotating aftersintering kiln is arranged between the burn chamber and the cooling shaft, for the treatment of special raw materials.

In FIG. 4 is illustrated a fourth embodiment of the present invention which is especially adapted for the aftersintering of special materials, particularly lime. Here, provisions are made for an extended aftersintering process to take place between the treatment in the burn chamber 3 and the cooling of the materials in the cooling shaft 13. For this purpose, there is arranged, between the main hearth 3b of the burn chamber 3 and the cooling shaft 13, a slightly inclined elongated rotary kiln which receives the materials directly from the lower reciprocating platform 6, via a downwardly extending chute 12, and which discharges the aftersintered materials directly into the upper end of a cooling shaft 13. The rotary kiln is heated by means of a burner unit 23 which is mounted in the head of the cooling shaft 13 and which blows hot gases through the lower open end of the rotary kiln 22. A burner blower 24 supplies primary combustion air to the burner unit 23. The drive of the rotary kiln 22 is indicated schematically at 25.

The present invention, in its proposed preferred embodiments, thus lends itself not only for the sintering of cement clinker, as described in detail further above, it is also suitable for the burning of lime, when certain proposed modifications are made. In addition to the foregoing applications, the invention also lends itself for the extraction of oil from oil shale and for the pelletizing of iron ore. Regardless of the particular use to which the invention is put, it has been found to be operating very economically, even at a small scale and with a small treatment capacity. This is so, because the various steps of the combined burning and sintering process can be separately and independently controlled and adjusted, in spite of the fact that they are taking place inside a single burn chamber. Because the entire burn plant is stationary, it readily lends itself for effective insulation, so that the radiation losses which are typical of other burn plants are substantially eliminated.

It should be understood, of course, that the foregoing disclosure describes only preferred embodiments of the invention and that it is intended to cover all changes and modifications of these examples of the invention which fall within the scope of the appended claims.

I claim the following:

1. An installation for the burning or sintering and subsequent cooling of cement clinker, lime, magnesite, dolomite, and similar materials in granular or crushed form, the installation comprising in combination:

an enclosed elongated burn chamber;

burner means supplying a flow of hot burn gases to a forward portion of the burn chamber;

gas circulation means drawing the used burn gases from the rear of the burn chamber;

at least two generally horizontally extending materials carrying movable platforms arranged inside the burn chamber in a staggered, vertically and rearwardly spaced relationship, so that materials which are discharged over the forward edge of the upper platform fall onto the lower platform, forming on the latter a forwardly facing natural slope on which the materials are exposed to the rearwardly flowing burn gases;

a charging shaft opening into the burn chamber at a point above the upper movable platform, so that raw materials which are fed into the burn chamber through said shaft form a similar, forwardly exposed natural slope on said platform;

a materials retaining back wall associated with each movable platform;

a platform drive connected to each movable platform, the drive imparting to the platform a reciprocating motion which causes materials from said natural slope to be discharged over the forward edge of the platform;

an intermediate wall extending downwardly from the ceiling of the burn chamber, said wall having a lower edge which is located forward of the upper platform and which reaches downwardly into contact with the upper end portion of the materials slope on the lower platform, said wall thereby subdividing the burn chamber into a forehearth for the upper platform and a main hearth for the lower platform.

2. A materials burning installation as defined in claim 1, wherein the intermediate wall includes flow passages allowing a portion of said flow of hot burn gases to pass through said wall into the forehearth.

3. A materials burning installation as defined in claim 2, further comprising at least one transverse baffle member arranged ahead of the lower edge of the intermediate wall, so as to protect said edge against the direct impingement of said flow of hot burn gases thereon.

4. A materials burning installation as defined in claim 1, wherein the materials retaining back wall associated with the upper movable platform is a stationary wall forming an extension of the charging chute;

the materials retaining back wall associated with the lower movable platform is likewise a stationary wall, extending downwardly from the forward edge of the upper movable platform;

both of said back walls are permeable to gas; and the gas circulation means includes suction connections to both back walls, drawing the used burn gases through said back walls.

5. A materials burning installation as defined in claim 4, wherein the gas circulation means includes a separate circulation blower for each hearth, the suction side of each blower being connected to one of said back walls.

6. A materials burning installation as defined in claim 5, wherein at least one of said gas permeable back walls is subdivided into a plurality of gas permeable back wall sections; and the gas circulation means includes means for adjusting the rate at which used gas is drawn through each back wall section.

7. A materials burning installation as defined in claim 5, wherein the circulation blower whose suction side is connected to the back wall of the lower platform, to draw used burn gases out of the main hearth, has its pressure side connected to the forehearth.

8. A materials burning installation as defined in claim 7, wherein said circulation blower includes a fresh air intake through which fresh air can be admixed to the used burn gases which are being blown into the forehearth.

9. A materials burning installation as defined in claim 5, wherein the circulation blower whose suction side is connected to the back wall of the upper platform, to draw used burn gases out of the forehearth, has its pressure side connected to the charging shaft, at a point near where the latter opens into the burn chamber, said blower blowing used burn gases into the charging shaft.

10. A materials burning installation as defined in claim 9, wherein the charging shaft is an elongated upwardly extending conduit through which the raw materials slide downwardly;

the gas circulation means further includes a blower having its suction side connected to the charging shaft, at a point above the point where the pressure side of said circulation blower is connected, so as to draw said used burn gases upwardly in a counterflow to the descending raw materials, thereby drying and preheating the raw materials.

11. A materials burning installation as defined in claim 1, further comprising:

a cooling shaft extending downwardly from the bottom of the burn chamber, in the forward portion of its main hearth;

air circulation means connected to the cooling shaft for cooling and burnt materials, as they descend through said shaft; and a chute arranged between the forward edge of the lower movable platform and the cooling shaft.

12. A materials burning installation as defined in claim 11, wherein the air circulation means includes a cooling air blower whose pressure side is connected to the cooling shaft, at a distance below its upper end; and the air which is being blown into the cooling shaft by the cooling air blower rises into the burn chamber, in a counterflow to the descending burnt materials, thereby cooling said materials and serving as secondary combustion air in the burn chamber.

13. A materials burning installation as defined in claim 11, further comprising a substantially horizontally oriented aftersinter platform arranged inside the main hearth, between the forward edge of the lower movable platform and the chute.

14. A materials burning installation as defined in claim 11, further comprising a transverse partition wall arranged in the upper end portion of the cooling shaft, in substantially parallel alignment with the latter, so as to define an aftersinter zone in said portion of the cooling shaft, between the partition wall and the chute.

15. A materials burning installation as defined in claim 1, further comprising:

a rotating aftersinter kiln, having its inlet side connected to an opening in the bottom of the burn chamber, in the forward portion of the main hearth;

means for rotating the aftersinter kiln;

secondary burner means supplying a flow of hot gases to the kiln, through its outlet opening, in a counterflow to the materials being treated;

a cooling shaft extending downwardly from the outlet side of the aftersinter kiln; and air circulation means connected to the cooling shaft for cooling the burnt and aftersintered materials, as they descend through said shaft.

16. A materials burning installation as defined in claim 1, further comprising an auxiliary chimney connected to the burn chamber, as a protection against explosions.

* * * * *